Figure 10:
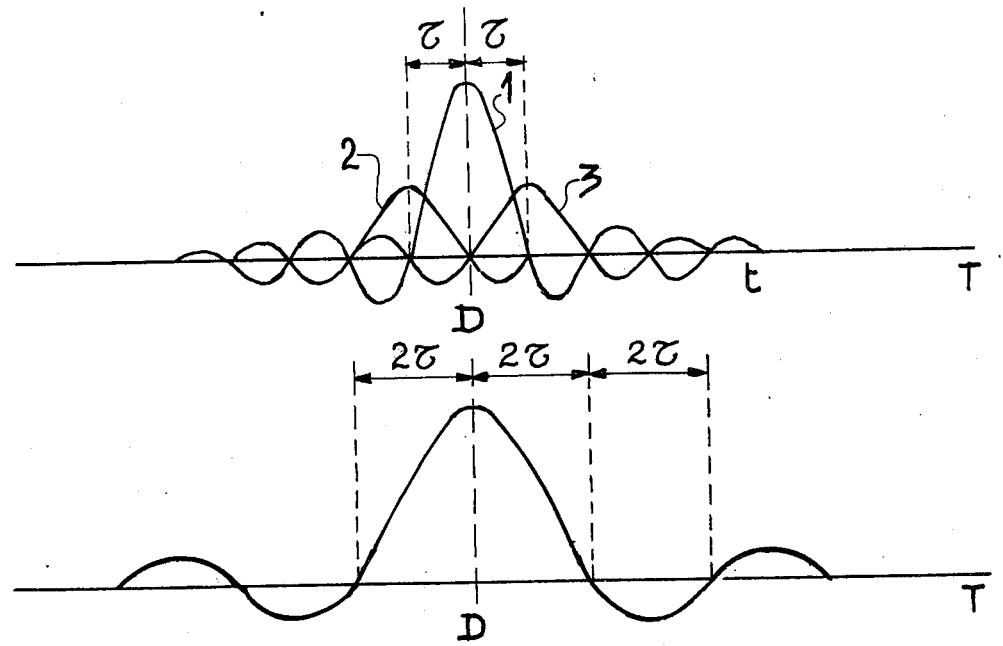

United States Patent [19]
Sarfati

[11] 4,114,154
[45] Sep. 12, 1978

[54] ARRANGEMENT ENABLING THE CONTRAST TO BE IMPROVED BETWEEN THE MAIN ECHO VIDEO-FREQUENCY SIGNAL AND A SECONDARY ECHO VIDEO-FREQUENCY SIGNAL RECEIVED BY A PULSE COMPRESSION RADAR

[75] Inventor: Pierre Sarfati, Paris, France
[73] Assignee: Thomson-CSF, Paris, France
[21] Appl. No.: 818,221
[22] Filed: Jul. 22, 1977
[30] Foreign Application Priority Data
Jul. 27, 1976 [FR] France .................................. 76 22833
[51] Int. Cl.² ........................................... G01S 7/28
[52] U.S. Cl. ..................... 343/17.2 PC; 343/100 LE; 343/7.3
[58] Field of Search ............... 343/17.2 PC, 17.2 R, 343/100 LE, 7.3; 325/323, 473; 328/127, 165

[56] References Cited
U.S. PATENT DOCUMENTS

| 2,804,614 | 8/1957 | Alvarez | 343/100 LE |
| 3,150,368 | 9/1964 | Price | 343/17.2 PC |
| 3,281,842 | 10/1966 | Cerar et al. | 343/17.2 PC |
| 3,388,330 | 6/1968 | Kretzmer | 325/323 |
| 3,568,193 | 3/1971 | Barton et al. | 343/100 LE |
| 3,618,095 | 11/1971 | Darlington | 343/17.2 PC |
| 3,651,433 | 3/1972 | Langley | 328/165 |
| 3,696,203 | 10/1972 | Leonard | 325/323 |
| 4,001,826 | 1/1977 | Moulton | 343/7.7 |

Primary Examiner—Maynard R. Wilbur
Assistant Examiner—Lawrence Goodwin
Attorney, Agent, or Firm—Cushman, Darby & Cushman

[57] ABSTRACT

An arrangement including an integrating circuit connected to the detection circuit of a pulse compression radar. The output of the integrating circuit is connected to a display tube of the radar. The integrating circuit has a control input connected to a distance shifting circuit. The distance shifting circuit is controlled by a first distance coincidence circuit operated by a first distance designating circuit and allows the secondary alternating lobes of the main video-frequency echo signal to be integrated at predetermined times for a period equal to the length of the central peak of a secondary echo signal. A second distance coincidence circuit operated by a second distance designating circuit allows the integration to be locked on to the central peak of the secondary echo.

10 Claims, 12 Drawing Figures

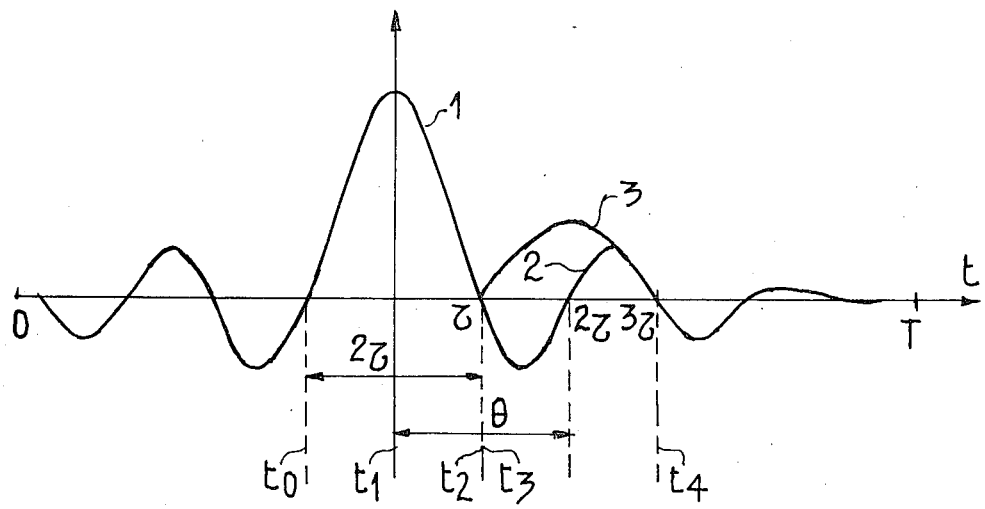
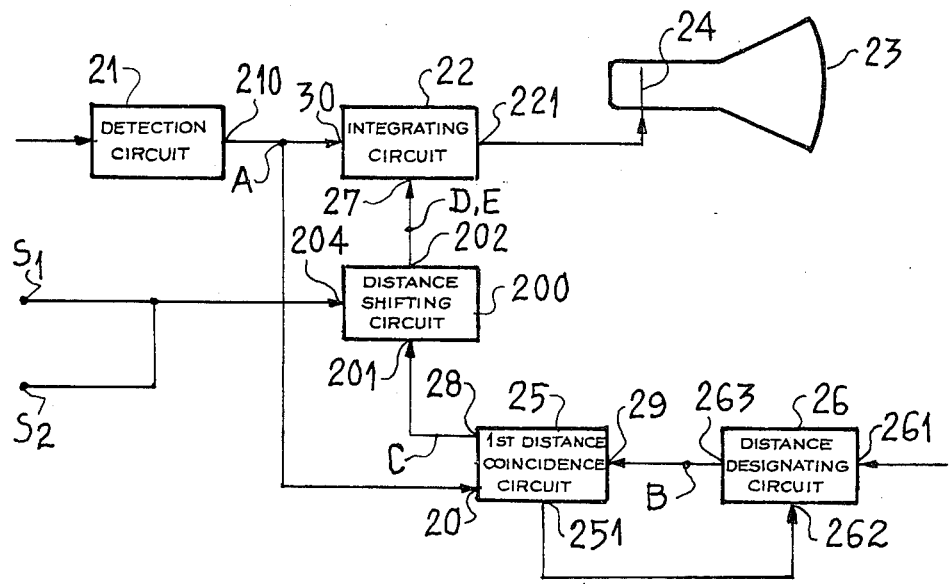

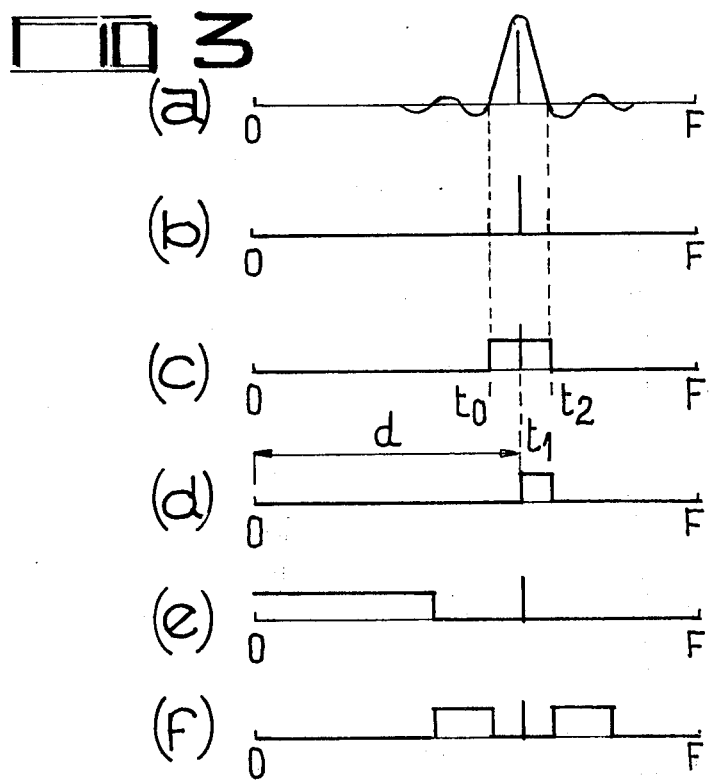
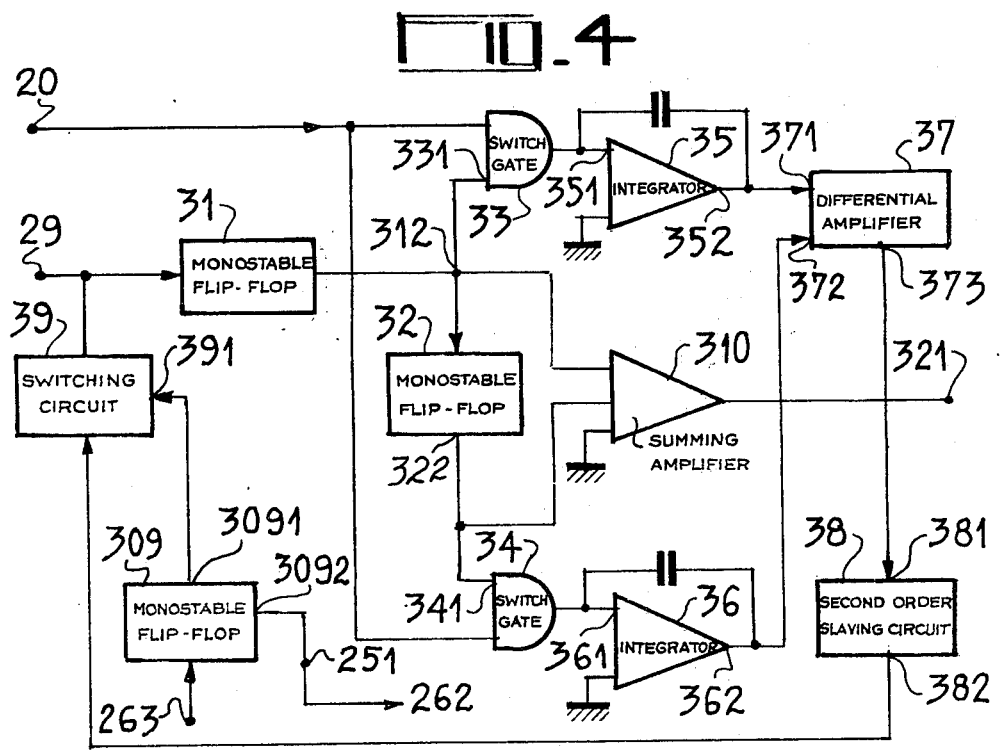

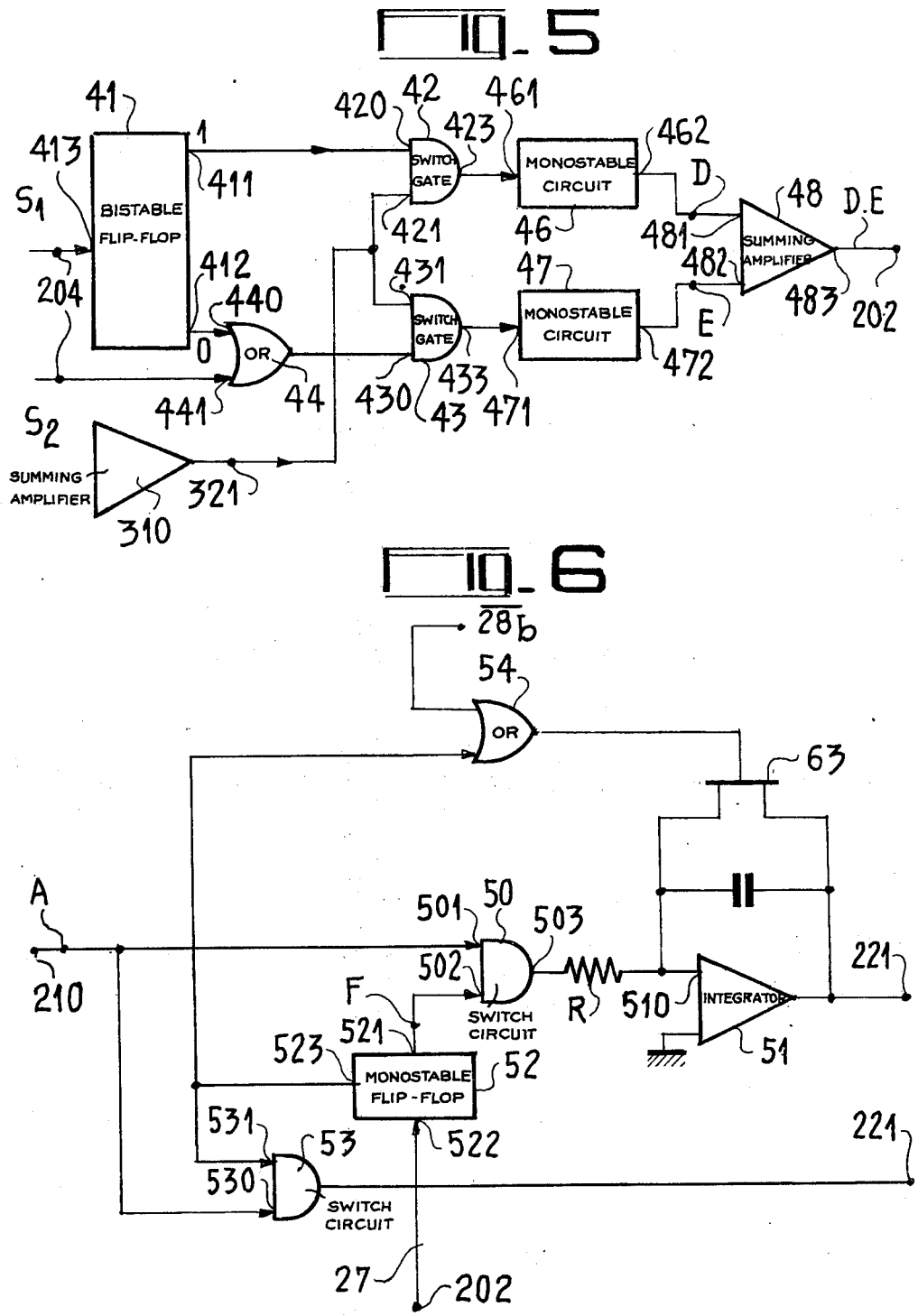

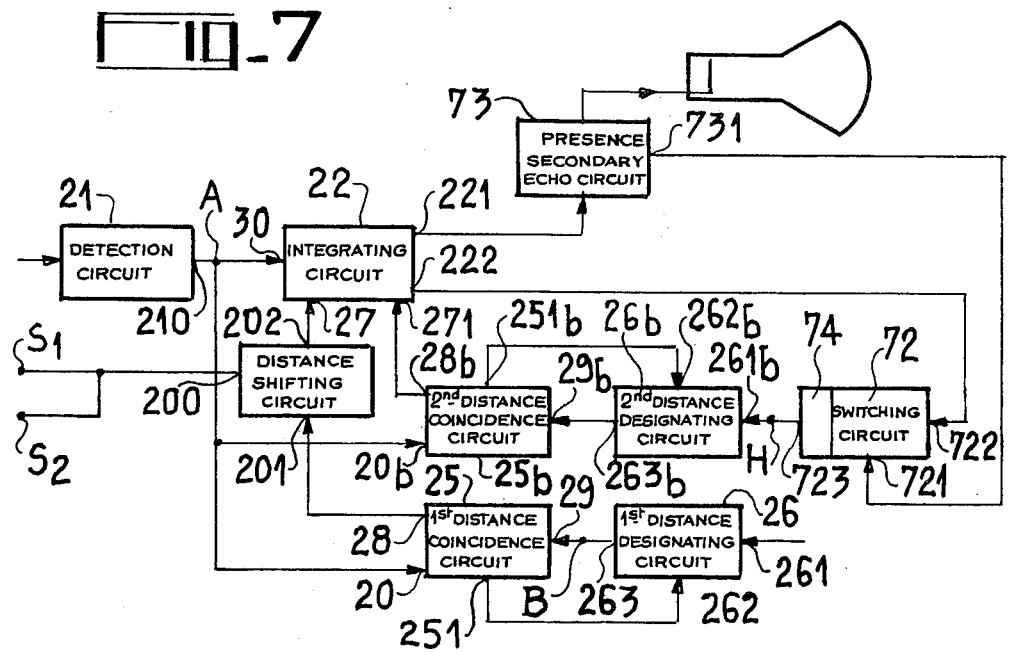
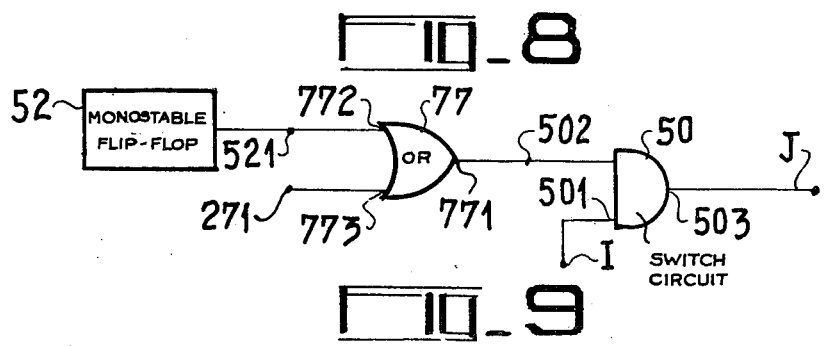
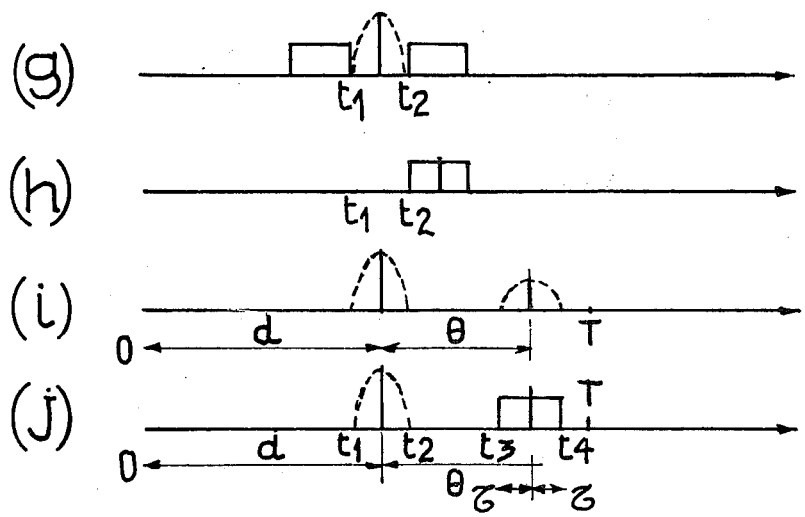

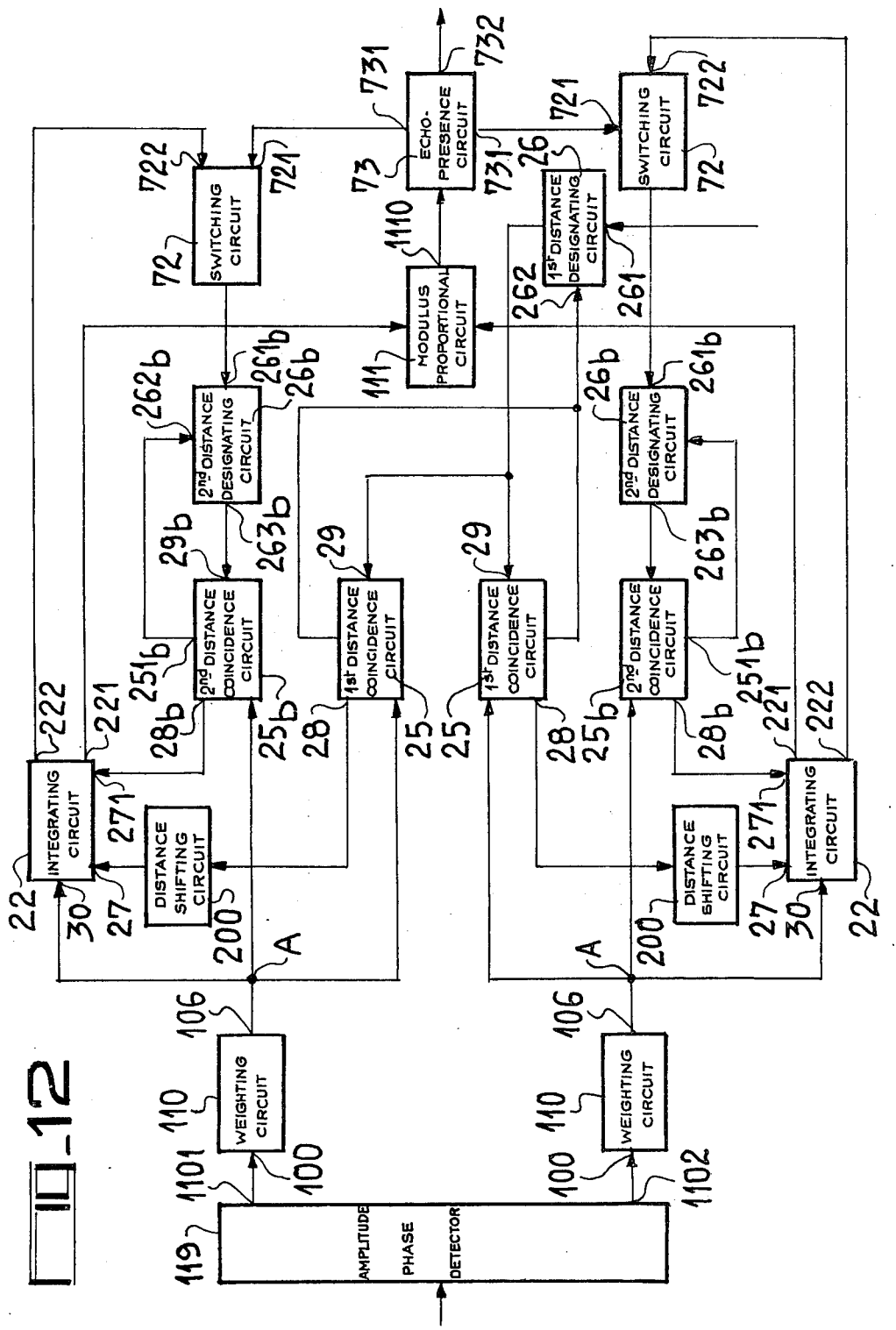

ARRANGEMENT ENABLING THE CONTRAST TO BE IMPROVED BETWEEN THE MAIN ECHO VIDEO-FREQUENCY SIGNAL AND A SECONDARY ECHO VIDEO-FREQUENCY SIGNAL RECEIVED BY A PULSE COMPRESSION RADAR

The present invention relates to an arrangement which enables the constrast to be improved between a main echo signal and a secondary echo signal of smaller amplitude which are received by a radar and which each consist of a central peak and alternating secondary lobes, and to a radar, such as a pulsecompression radar in particular, which incorporates such an arrangement.

The video-frequency echo signal generally contsists of a series of signals comprising a central peak and a succession of alternating secondary lobes preceding and following the central peak of the echo in one transmission cycle of the radar. In the particular case of a pulse compression radar, the video-frequency echo signal consists of a plurality of signals of the general form $S(t) = (A \sin \pi Bt)/(\pi Bt)$ where $B = 1/\tau$, each signal corresponding to the echoes produced by obstacles or targets situated in the field scanned by the radar.

These signals contain a central peak whose amplitude bears a direct relationship to the corresponding obstacle which produced them and whose width is equal to $2\tau$, and a series of secondary peaks or secondary lobes which alternate between points at which the signal is zero and which are $2\tau$ apart. Thus, a main echo whose central peak has a given amplitude corresponding to a given obstacle, is, when there is a neighbouring obstacle or target of smaller size present, accompanied by a secondary echo corresponding to the neighbouring obstacle, the central peak of the secondary echo being in this case of lower amplitude than the central peak of the main echo and being shifted in time by $\theta$ in relation thereto. The signal representing the secondary echo is of the form $$S(t - \theta) = \frac{B \sin \pi B (t - \theta)}{\pi B (t - \theta)}$$

where $\theta$ actually represents the measured distance, in terms of the propagation time of the echo signals, separating the two points in space at which the main echo and the secondary echo were generated.

When the displacement $\theta$ of the secondary echo signal is such that the central peak of the secondary echo coincides with a secondary peak or lobe of the main echo, there is a danger that, because of the low amplitude of the central peak of the secondary echo, the secondary lobe of the main echo will mask the central peak of the secondary echo and thus the secondary echo itself.

The result of this is a reduction in the discriminating ability of the radar.

A known solution to this problem consists in weighting the video-frequency signal in the receiver of the radar. The effect of this weighting is a decrease in the amplitude of the secondary lobes of the echo signal and an increase in the width of the central peak. The weighting also enables each of the cycles forming the secondary lobes or secondary peaks of an echo to be made substantially symmetrical.

However, this solution does not provide an entirely satisfactory solution to the aforementioned problem because the secondary lobes are still present even after weighting.

The present invention enables the problem which exists to be solved in a more rational fashion.

One object of the present invention is to achieve a reduction in the mean level of the secondary lobes of a main echo over a predetermined length of time.

Another object of the present invention is, by reducing the mean level of the said secondary lobes, to increase the contrast between the central peak of a secondary echo and the secondary peaks or lobes of a main echo.

A third object of the present invention is, to increase the contrast between the main echo and the secondary echo.

In accordance with the invention, an arrangement which enables the contrast to be improved between a main echo signal and a secondary echo signal received by a radar and which each consist of a central peak and alternating secondary lobes, includes means which enable the video-frequency signal supplied by the detection circuit of the radar to be integrated at given times and for a period equal to the duration of the central peak of the secondary echo, the said means for integrating the video-frequency signal being controlled by one or more distance-coincidence circuits of which one at least is connected to a circuit for designating the distance of the main echo.

Such arrangements enable to detect the appearance of an echo whose amplitude is small in comparison with the main echo, such for example as the secondary echo generated by the release of a nose-cone from the body of a ballistic rocket, and the arrangement can be used with any radar system whose video-frequency echo signals consist of a central peak and a succession of alternating secondary lobes.

The arrangement according to the invention enables the video-frequency signal to be integrated for a period which is made equal to the duration or width of the central peak of the secondary echo, the initiation of integration taking place at predetermined times. The integration of the alternating secondary peaks or lobes for a period equal to the width of the central peak of the secondary echo allows the secondary peaks or lobes to be attenuated and the contrast to be increased at the stage of circuits for processing the radar signal, such for example as the radar display.

Figure 11:
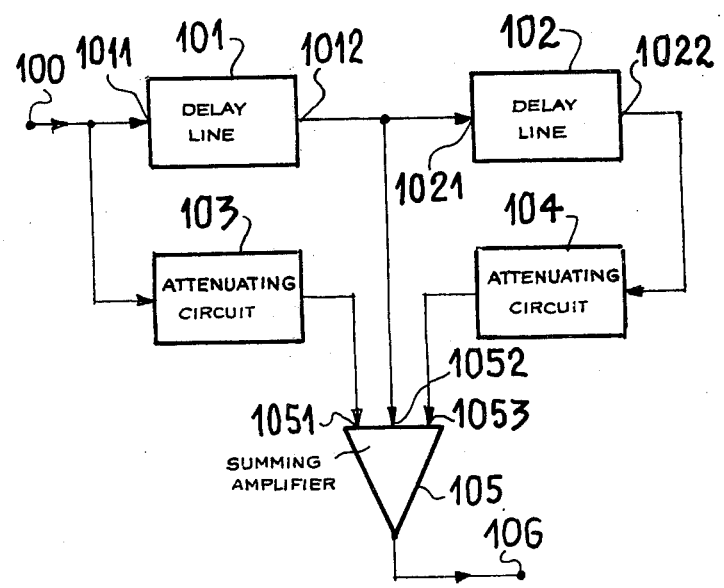

The invention will be better understood from the following description and drawings, in which:

FIG. 1 represents the video-frequency waveforms of a main echo in a pulse compression radar, FIG. 2 is a block diagram of the subject of the invention, FIG. 3 shows waveforms at particular points in the arrangement which is the subject of the invention and which is shown in FIGS. 2, 4, 5 and 6, FIG. 4, 5 and 6 show details of an embodiment of the subject of the invention, FIG. 7 shows one embodiment of the arrangement which is the subject of the invention, FIG. 8 shows a detail of the embodiment of the arrangement which is the subject of the invention, in the form in which the arrangement is shown in FIG. 7, FIG. 9 shows particular signal waveforms at characteristic points of the arrangement shown in FIG. 7 and 8, FIG. 10 shows a video-frequency signal of a pulse compression radar after weighting, FIG. 11 and 12 show a particular embodiment of the subject of the present invention.

FIG. 1 shows, against an abscissa graduated in time and an ordinate graduated in amplitude, the video-frequency waveform of a main echo and the central peak of a secondary echo, in a pulse compression radar after the signal has passed through a filter matched to the emitted signal. The central peaks 1 and 3 of the main and secondary echos have a duration of $2\tau$ and are shifted by a time of $\theta$. The secondary lobes 2 of the main echo are alternating and are separated by points at which the signal is zero which are spaced apart by a period of $\tau$. The length of this period $\tau$ depends solely on the frequency modulation of the transmitted signal. In the example shown in FIG. 1, the time $\theta$ is equal to $2\tau$ and the amplitude of the second lobes of the main echo is close to that of the central peak or lobe of the secondary echo, conditions being particularly unfavourable for the detection of the central peak of the secondary echo in the case of the example shown in FIG. 1. The transmission repetition period of the radar is equal to T. In the example shown in FIG. 1, the times $t0$ and $t2$ at which the main echo signal is zero define the duration of the central peak of the main echo. In the same way, the times $t3$ and $t4$ at which the secondary echo signal is zero define the duration of the central peak of the secondary echo. In the particular non-limiting example shown in FIG. 1, the times $t1$ and $t3$ coincide.

As shown in FIG. 2, the arrangement which is the subject of the invention includes means for integrating the video-frequency echo signal, i.e. an integrating circuit 22. The integrating circuit has its input 30 connected to the output 210 of a circuit 21 for detecting the medium frequency signal from the radar receiver. The output 221 of the integrating circuit 22 is connected to means for processing the signal, being connected for example directly to the Wehnelt electrode 24 of a display tube 23 of the radar receiver. The integrating circuit 22 has a control input 27 connected to the output 202 of a distance shifting circuit 200 whose inputs 204 and 201 are respectively connected to a selecting register (not shown) by channels S1 and S2, and to the output 28 of a first distance-coincidence circuit 25. The first distance-coincidence circuit 25 has an input 29 connected to an output 263 of a distance-designating circuit 26 and an input 20 directly connected to the output 210 of the detection circuit 210 of the detection circuit 21 of the radar. The distance-designating circuit 26 has an input 262 for zero reset after initialisation, which is connected to an output 25 of the distance-coincidence circuit 25, and an input 261 connected to an ancillary apparatus for determining the distance of the main echo. The ancillary apparatus for determining the distance of the main echo supplies information relating to the distance in time between the main echo and the time origin of each repetition cycle.

The way in which the arrangement operates is as follows. The video-frequency signal for the main echo and the secondary echo is transmitted from the output 210 of the detection circuit 21, on the one hand to the integrating circuit 22 and on the other hand to the first distance-coincidence circuit 25. By using the ancillary apparatus, such as a watching radar for instance, which is not shown in FIG. 2, the distance designating circuit 26 supplies information relating to the distance separating the central peak of the main echo from or its displacement in time from, the time orgin of each transmission repetition cycle of the radar. These different signals are shown in FIG. 3 at $a$ and $b$ respectively and corresponds to the signal waveforms at points A and B in FIG. 2.

From its output 28, the first distance-coincidence circuit 25 delivers to the input terminal 201 of a distance shifting circuit 200, two successive and equal squarewave signals whose duration is equal to $\tau$ and which give rise to a resulting squarewave signal between the times $t0$ and $t2$ corresponding to the zero points of the signal defining the central peak of the main echo. The resulting signal contains an identification of the time $t1$, representing the distance $d$ between the central peak of the main echo and the time origin of the radar transmission cycle, which is such that $t1 = (t0 + t2/2)$. The central peak of the main echo is at its maximum at time $t1$. The corresponding resulting signal at point C in FIG. 2 is shown in FIG. 3c. The distance shifting circuit 200 supplies from its output terminal 202 a signal for initiating the integration of the video-frequency signal.

In accordance with the invention, the times at which the integration of the video-frequency signal is initiated are situated, in a given transmission cycle, before the time $t0$ at which the central peak of the main echo is zero, and/or after the time $t2$ at which the central peak of the main echo is zero, $t0$ and $t2$ being the times which define the duration of the central peak of the main echo, with a view to enabling integration of the secondary lobes of the main echo which precede and/or succeed the central peak of the main echo.

Using the integration initiating signals supplied by terminal 202 of the distance shifting circuit, the integrating circuit 22 allows the video-frequency signal to be integrated one or more times, during a period which is made equal to the duration of the central peak of the secondary echo for each integration.

In fact, it may not be possible to achieve exact coincidence between the rising and decaying edges of the resulting square-wave signal shown in FIG. 3c and the zero-points of the signal which define the central peak of the main echo at the time of initialisation during a single repetition signal of the radar, because of the relative inaccuracy of these times in the waveform of the signal supplied by the distance designating circuit 26 and the ancillary apparatus.

Exact coincidence is achieved by integrating the central peak of the main echo separately during each successive square-wave signal of the same duration which forms the resulting square-wave signal, and by a corresponding shift of the rising edge of the first square-wave signal of duration $\tau$ which is supplied by the distance-coincidence circuit 35, as indicated by a comparison of the result of each separate integration. Thus, exact coincidence between the resulting square-wave signal and the zero-points of the echo signal which define the central peak of the main echo is achieved over a number of radar-transmission repetition cycles by successive approximations and slaved adjustment of the resulting square-wave signal, supplied by the coincidence circuit 25, to the central peak of the main echo.

The distance-coincidence circuit 25 is a conventional radar range-finding circuit.

As shown in FIG. 4, it may contain for example two integrators 35 and 36 whose inputs 351 and 361 are connected via respective switching gates or circuits 33 and 34 to the output 210 of the detecting circuit 21 via terminal 20. The gates 33 and 34 have their control electrodes 331 and 341 connected, respectively via a monostable flip-flop 31 and via two monostable flipflop 31 and 32 in series, whose unstable state lasts for a period equal to τ, to the output 263 of the distance-designating circuit 26. The outputs 352 and 362 of the integrators are connected to inputs 371 and 372 respectively of a comparator which is formed by a differential amplifier 37. The output 373 of the comparator is connected to the input 381 of a second-order slaving circuit 38 whose output 382 is connected to the control input 29 of integrators 35 and 36 via a switching circuit 39 whose control input 391 is connected to the output 263 of the distance designating circuit 26 via a monostable circuit 309 whose unstable period is 2 τ for example. The monostable 309 has an output 3091 connected to the input 391 of the switching circuit 39 and a complemented output 3092 connected via terminal 251 to the input 262 of the distance-designating circuit 26. The complemented output 3092 allows the distance designating circuit 26 to be reset to zero after initialisation.

As a function of the input error supplied by output 373 of the comparator, the second-order slaving enables this error to be corrected and reduced to zero and enables the circuit 39 to switch in response to the output signal from the distance coincidence circuit 26 after a delay of 2 τ caused by monostable 309, thus forming a tracking control loop ensuring that the resultant square-wave signal is centred on the central peak of the main echo.

The outputs 312 and 322 of monostable circuits 31 and 32 are connected to the sum inputs of a summing amplifier 310 whose output 321 forms the output 28 of the distance coincidence circuit.

The output 28 of the distance coincidence circuit 25 is connected to a first input 201 of the distance shifting circuit 200. The distance shifting circuit 200 includes for example, as shown in FIG. 5, a bistable flip-flop 41 whose triggering input 413 is connected to the selecting register via terminal 204 and whose complemented outputs 411 and 412 are connected, respectively directly and via input 440 of a logic OR circuit 44, to the control inputs 420 and 430 of switching gates or circuits 42 and 43. The switching circuits 42 and 43 each have a switching input 421 or 431 connected to the output terminal 321 of the summing amplifier 310.

The logic OR circuit 44 has a second input 441 connected directly to the selecting register (not shown). The switching members 42 and 43 have their outputs 423 and 433 connected to respective ones of the triggering inputs 461 and 471 of monostable circuits 46 and 47. The times for which the monostable circuits 46 and 47 remain in the unstable state can be adjusted respectively to values greater than or equal to τ and less than or equal to T-3 τ. The monostables 46 and 47 have their outputs 462 and 472 connected to the sum inputs 481 and 482 of a summing amplifier 48 whose output 483 is connected by terminal 202 to the input 27 of the integrating circuit 22. FIG. 3d and 3e show the signal supplied at point D, E from the output 202 of the distance shifting circuits 200. Depending upon the choice which is made, the selecting register (not shown) emits logic levels 0 or 1 onto each channel S1 and S2 independently.

The manner in which the distance shifting circuit operates is as follows: The wave-forms shown correspond to the unstable states of the monostable circuits 46 and 47 being adjusted to be equal to τ and $t - 3\tau$ respectively. Depending the displacement selected at the secting register (not shown), the switching circuits or gates 42 and 43 are respectively made alternately and complementarily conductive and non-conductive by the complementary outputs 411 and 412 of bistable circuit 41. When switching circuit 42 is made conductive, monostable circuit 46 whose unstable period is τ emits a pulse, derived from the pulse supplied at 321 by amplifier 310, which is delayed by τ relative to time t and which is in turn emitted from output 483 of summing amplifier 48. When, on the other hand, switching circuit 43 is made conductive by the action of output 412 of bistable 41, monostable circuit 47 whose unstable period is T − 3 τ, emits a pulse, derived from the pulse emitted at 321 by amplifier 310, which is delayed by T − 3 τ in relation to t1 in the repetition cycle concerned. This pulse corresponds to a pulse which is 3 τ in advance of t1 in the next cycle. This pulse is emitted from output 483 of the summing amplifier 48. The signal which are emitted by output 483 of amplifier 48 depending upon the setting of the register are shown at d and e in FIG. 3 in the case of initiation times which are respectively behind and in advance of the position of the central peak.

The time of initiating the integration of the video frequency signal to integrate the secondary lobes preceding and/or succeeding the central peak of the main echo can be selected by a single operation at the register (not shown). The combination of logic values on the channels S1 and S2 connected to the selecting register enables the desired possibilities to be selected.

Adjusting the unstable states of the monostables 46 and 47 to be respectively longer than τ and less than T − 3 τ allows an excursion by one complete transmission repetition cycle to be made by shifting the time of initiation of the integration. The signals supplied to the output point 202 of the distance shifting circuit 200 which are shown in FIGS. 3d and 3e, correspond to the periods of the monostables 46 and 47 being made equal to τ and T − 3 τ respectively.

As shown in FIG. 6, the integrating circuit 22 may for example include an integrator 51 whose output 22 forms the output terminal of the integrating circuit 22. The integrator 51 has its input 510 connected to the output terminal 210 of the detection circuit of the radar via a switching circuit 50 whose control terminal 502 is connected to the output 521 of a monostable flip-flop 5 whose unstable period is equal to 2 τ. Flip-flop 52 has an input 522 which forms the input terminal 27 of the integrating circuit. The integrating circuit includes a zero reset circuit which is formed by a field effect transistor 63 whose control electrode is connected to the output 523 complementary to output 521 of flip-flop 52. Field effect transistor 63 is normally conductive but is rendered non-conductive by monostable flip-flop 52. A switching circuit 53 whose control electrode 531 is connected to terminal 523 of monostable flip-flop 52 is responsible for transmitting the video-frequency signal along its input electrode 530, which is connected to terminal 210 of the detecting circuit 21, outside the integrating periods.

The integration controlling signals at point f which correspond to the initiating signals in FIGS. 3d and 3 are shown in FIG. 3f.

The distance designating circuit 26 is formed, for example, by a bistable circuit connected to a differentiating circuit. The input 261 of the bistable circuit is connected to the ancillary apparatus (not shown), such as a watching radar, which supplies information relating to the distance of the central peak of the main echo Input 262 of circuit 26 is connected, for example, to th complementary output 3092 of monostable 309 and enables the bistable circuit forming the distance designating circuit to be restored to its initial state after the distance-coincidence circuit has been initialised. The detection circuit 21 is a conventional detection circuit which preserves the alternating nature of the secondary lobes. In the particularly unfavourable case shown in FIG. 1, the ratio between the main peak and the secondary lobes of the main peak and the secondary lobes of the main echo is of the order of 13 dB. A secondary echo whose main peak is of the main echo has a ratio equal to 1, that is to say zero decibel attenuation without integration. According to the invention, the ratio or attenuation of the secondary lobes of the main echo relative to the main peak of the secondary echo is brought to a value of the order of one quarter, i.e. an attenuation of approximately 12dB, thereby increasing the amount of contrast.

This arrangement permits automatic centering by slaving the integration to the central peak of the secondary echo when the presence of the latter is detected by the first circuit, the means for integrating the video-frequency signal being actuated by the distance-coincidence circuits at the times $t3$ and $t4$ at which the video-frequency signal for the secondary echo is zero and which define the duration of the central peak of the secondary echo, i.e. the times defining the central peak of the secondary echo. The actuating signal thus coincides with the central peak of the secondary echo.

To this end, the embodiment shown in FIG. 7 includes, for example, a second slaving circuit whose parts are identical to those of the first circuit described above, such as 25b and 26b, which are respectively identical to the circuits 25 and 26 described above.

The second distance- designating circuit 26b has its input 261b connected to a switching circuit 72 whose input 722 is connected to an output 222 of the integrating circuit 22. Output 222 of the integrating circuit 22 supplies the integration control signal which is present at 521 because of the first slaving circuit. This signal is shown in FIG. 3f for example. The switching circuit 72 has a control input 721 connected to a circuit 73 for the presence of a secondary echo which enables the presence of a secondary echo, or a level representing the presence of a said secondary echo, to be detected as coinciding with all or part of the integration signals supplied by the first slaving circuit. The echo-presence signal 73 and the switching circuit 72 perform the function, as far as the second slaving circuit is concerned, of the first slaving circuit. The signal emitted by switching circuit 72 is preferably divided into two squarewave signals of identical length which are shown in FIG. 9h, and which correspond to point H in FIG. 7, by means of two monostable circuits which are connected in series and whose unstable state lasts for a time equal to $\tau$. The two monostable circuits are respresented by circuit 74.

The way in which the second slaving circuit operates on the basis of the distance reference supplied to the second distance designating circuit 26b by the echo-presence circuit 73 and by the switching circuit 72 is identical to that in which the first slaving circuit operates, with the integration control signal being locked onto the central peak of the secondary echo. The second coincidence circuit 25b has its output 28b connected to input 271 of integrating circuit 22.

FIG. 8 shows the respective connections between the first and second slaving circuits and the integrating circuit 22. The terminals 521 (FIG. 6) and 271 (FIG. 7) of the integrating circuit 22 are connected to input terminals 772 and 773 respectively of an OR circuit 77 whose output 771 is connected to the control terminal 502 of the switching circuit 50. The integrating circuit is reset to zero, after an integration of the video-frequency signal centered on the central peak of the secondary echo, by connecting the OR circuit 54 to an output marked 28b, complementary to output 28b, of the second distance-coincidence circuit 25b. The various signals corresponding to points I,J in FIG. 8 are shown in FIGS. 9i and 9j, FIG. 9j showing the integration control signal which is applied to the switching circuit 50 when the second shaving circuit has locked the integration signal to the central peak of the secondary echo. As shown in FIG. 9, times $t2$ and $t3$ no longer coincide.

In a preferred embodiment of the present invention, better contrast is achieved by using a system for weighting the video-frequency echo signal in conjunction with the arrangement which is the subject of the present invention. A video-frequency echo signal which has been weighted by summing with a main one of two alternating video-frequency signals which are respectively advanced and delayed by a time equal to $\tau$, has the following particular characteristics in the case of the signal in a pulse compression radar.

In the non-limiting embodiment which has been selected, the attenuation of the two weighting signals is equal to $K = 0.375$ and their time of advance or delay relative to the main signal is equal to $\tau$. The signal obtained after weighting is shown in FIG. 10. The first zero-point of the function of the weighted signal is at 2 96 from the maximum of the central peak and the width of the latter is doubled and is equal to 4 $\tau$.

Furthermore, because of the weighting, the alternating secondary lobes are symmetrical and their duration is equal to 2 $\tau$. Since the width of the main peak is equal to 4 $\tau$, the integration of the video-frequency signal for the alternating and symmetrical secondary lobes for a period which is spread out to 4 $\tau$ enables the mean level of the secondary lobes to be reduced to zero after integration. The attenuation between the central peak and the first secondary lobe of the main echo is equal for the signal weighted at 25dB in the previous example.

The arrangement which enables the video-frequency signal to be weighted is shown in FIG. 11. It includes a delay line 101 whose input 1011 is connected by terminal 100 to the output 10 of the detector 21 shown in FIG. 7, and whose output 1012 is connected firstly to input 1021 of a second delay line 102. The delay lines 101 and 102 each apply a delay of $\tau$ to the signal supplied to terminal 100. The output terminal 1012 of delay line 101 is connected to a sum input 1052 of a summing amplifier 105. The output 1022 of delay line 102 is connected via an attenuating circuit 104 to a sum input 1053 of summing amplifier 105. Terminal 100 of the weighting arrangement is connected via an attenuating circuit 103 to a sum input 1051 of summing amplifier 105. The output 106 of summing amplifier 105 is connected at point A of the arrangement shown in FIG. 7 to the input 30 of the integrating circuit 22 and to input 20 of the distance coincidence circuit 25.

Integrating the video-frequency signal from the central peak of a secondary echo for a period equal to the duration of this central peak, i.e. for 4 $\tau$, allows, in the case of the first two alternating secondary lobes and for a secondary echo whose attenuation relative to the central peak of the main echo is equal to 30 dB, an improvement in contrast of 34 dB to be achieved relative to the secondary lobes after integration.

In the preferred embodiment of the present invention which is shown in FIG. 12, the detection circuit 21 is formed by a conventional amplitude/phase detector 119 whose output 1101 and 1102 respectively supply signals which represent the components of the input signal and are identical but out of phase by $\pi/2$ and which after filtering provide the video-frequency signal for each channel.

The channels, which are termed the sine and cosine channels respectively, each include an arrangement according to the invention such as shown in FIG. 7 for example. Point A of each channel as shown in FIG. 7 is connected to the output 1101 or 1102 of either the sine or cosine channel of the detector via a weighting circuit 102 as shown in FIG. 11. The output 221 of each integrating circuit 22 is connected to a circuit 111 which emits from its output 1110 a signal proportional to the modulus of the echo signal. The signal proportional to the modulus of the echo signal is supplied to an echo-presence circuit 73 which is provided with an integrator having a long time-constant. The output 731 of the echo-presence detecting circuit 73 is connected to the control input 721 of the switching circuit 72. The way in which the two slaving circuits operate, which are formed by in each of the channels, circuits 26, 25 and 200 in the case of the first circuit and by circuits 73, 72, 26b and 25b in the case of the embodiment shown in FIG. 7. The form taken by the slaving circuits in each channel is identical to that of the slaving circuits in FIG. 7 except that the unstable period of any monostable circuit whose unstable state is a function of the value $\tau$ is altered by changing $\tau$ to $2\tau$ because of the doubling of the duration of the central peak of the main echo and of the secondary lobes of the weighted signal. The output 732 of the echo-presence detecting circuit is connected to circuits for processing the signal such as a radar display for example.

There has thus been described an arrangement which enables contrast to be improved in a radar, in particular a pulse compression radar, by integrating the secondary lobes of the main echo for the duration of the central peak of the secondary echo.

What we claim is:

1. An arrangement which enables contrast to be improved between the main echo video-frequency signal and a secondary echo video-frequency signal of a pulse compression radar receiver, each of said main and secondary echo signals consisting of a central peak and alternating secondary lobes, wherein said arrangement comprises:

means for integrating said main and secondary video frequency signals at a predetermined instant and for a time equal to the duration of the central peak of said secondary echo;

at least one distance coincidence circuit and a distance designating circuit of said main echo connected to said distance coincidence circuit, said means for integrating said main and secondary video frequency signals being controlled by said distance coincidence circuit and said distance designating circuit; and means connected to said integrating circuit for processing said main and secondary echo signal after integration.

2. An arrangement according to claim 1, wherein said means for integrating said main and secondary video frequency signals are operated by said distance coincidence circuit at times before $t_0$, $t_0$ and $t_2$ being the times defining the respective beginning and end of the central peak of said main echo.

3. An arrangement according to claim 1, wherein the said means for integrating the said main and secondary video frequency signals are operated by said distance coincidence circuit at times after $t_2$, $t_0$ and $t_2$ being the times defining the respective beginning and end of the central peak of said main echo.

4. An arrangement according to claim 1, wherein said means for integrating said main and secondary video frequency signals are operated by said distance coincidence circuit at times before $t_0$ and after $t_2$, $t_0$ and $t_2$ being the times defining the respective beginning and end of the central peak of said main echo.

5. An arrangement according to claim 4, wherein said means for integrating said main and secondary echo video frequency signals are operated by said distance coincidence circuit at the times $t_3$ and $t_4$ at which the video frequency signal for the secondary echo is zero and which define the duration of the central peak of the secondary echo video frequency signal thereby allowing automatic centering by slaving the integration to the central peak of said secondary echo.

6. An arrangement which enables contrast to be improved between the main echo video frequency signal and a secondary echo video frequency signal received by a pulse compression radar receiver, each echo signal consisting of a central peak and alternating secondary lobes, wherein said arrangement comprises:

a detection circuit for detecting the medium frequency signal from the radar receiver, said detection circuit delivering, when operating, said main and secondary echo video frequency signals;

means for integrating said main and secondary echo video frequency signals at a predetermined instant and for a time equal to the duration of the central peak of said secondary echo, said means for integrating said main and secondary echo video frequency signals including an integrating circuit, said integrating circuit having a control input and an input connected to said detection circuit for receiving said main and secondary echo video frequency signals from said detection circuit; and a first distance coincidence circuit and a distance shifting circuit, said distance shifting circuit having a control input and an output connected to said control input of said integrating circuit, said first distance coincidence circuit having on the one hand a first and second input, said first input of said distance coincidence circuit receiving in operation said main and secondary echo video frequency signal, and, on the other hand, an output connected to said control input of said distance shifting circuit, said output of said first distance coincidence circuit delivering to said distance shifting circuit a square wave between the times $t_0$ and $t_2$ corresponding to the zero points of the signal defining the central peak of said main echo video frequency signal;

a first distance designating circuit with an input and an output, said output of said first distance designating circuit being connected to said second input of said first distance coincidence circuit and delivering to said second input of said first distance coincidence circuit information relating to the distance separating said central peak of said main echo from the time origin of each transmission repetition cycle of the radar; and a display tube connected to said integrating circuit for processing said main and secondary echo signals after integration.

7. An arrangement according to claim 6, wherein the integrating circuit includes:

a switching circuit having a control input;

an integrator having an input connected to the output of said detection circuit via said switching circuit; and a monostable circuit whose unstable state lasts for a duration equal to the duration of the central peak of the secondary echo, said control input of said switching circuit being connected to the output of said distance shifting circuit via said monostable circuit.

8. An arrangement according to claim 6, further including:

a switching circuit;

a circuit for detecting the presence of a secondary echo and controlling said switching circuit; and a second distance coincidence circuit and a second distance designating circuit, said second distance coincidence circuit having on the one hand an input connected to said second distance designating circuit, said second distance coincidence having an input connected to the output of the detection circuit and an output connected to a control input of said integrating circuit and delivering to said control input an actuating signal coinciding thus with the central peak of the secondary echo, said second distance designating circuit having an input connected to the output of the integrating circuit via said switching circuit.

9. An arrangement according to claim 8, including a weighting circuit having an input connected to the output of the detection circuit and an output directly connected on the one hand to the input of the integrating circuit and on the other hand to the inputs of said first and second distance coincidence circuits.

10. An arrangement according to claim 8, wherein said detection circuit is an amplitude phase detector with two outputs delivering a same video frequency signal out of phase by $\pi/2$, said outputs constituting a sine and cosine channel respectively, said arrangement comprising connected to each channel:

said integrating circuit and said first and second distance coincidence circuit and said distance designating circuit, each said integrating circuit being controlled by the respective said first and second distance coincidence circuits and by the respective said distance designating circuit, said arrangement further comprising, on the one hand;

a modulus circuit which supplies the modulus of the signal resulting from the signal supplied by each cosine and sine channel, each of said integrating circuits being connected to an input of said modulus circuit and delivering to said input an integrated video signal, and, on the other hand a secondary echo circuit for detecting the presence of a secondary echo, said secondary echo circuit detecting the presence of a secondary echo and supplying to said second distance designating circuit and integration control signal allowing the integration control signal to be locked on the central peak of said secondary echo.

* * * * *